United States Patent [19]

Barajas et al.

[11] Patent Number: 5,598,551
[45] Date of Patent: Jan. 28, 1997

[54] CACHE INVALIDATION SEQUENCE SYSTEM UTILIZING ODD AND EVEN INVALIDATION QUEUES WITH SHORTER INVALIDATION CYCLES

[75] Inventors: Saul Barajas, Mission Viejo; David M. Kalish, Laguna Niguel; Bruce E. Whittaker, Mission Viejo; Keith S. Saldanha, Trabulo Canyon, all of Calif.

[73] Assignee: Unisys Corporation, Blue Bell, Pa.

[21] Appl. No.: 602,259

[22] Filed: Feb. 15, 1996

Related U.S. Application Data

[63] Continuation of Ser. No. 93,428, Jul. 16, 1993, abandoned.

[51] Int. Cl.$^6$ .............................. G06F 12/00; G06F 12/06
[52] U.S. Cl. .......................... 395/484; 395/405; 395/427; 395/454; 364/DIG. 1
[58] Field of Search ..................................... 395/405, 445, 395/454, 468, 471, 472, 473, 484, 463, 464, 467; 364/DIG. 1

[56] References Cited

U.S. PATENT DOCUMENTS

| | | | |
|---|---|---|---|
| 4,378,591 | 3/1983 | Lemay | 395/425 |
| 4,648,030 | 3/1987 | Bomba et al. | 364/200 |
| 4,768,148 | 8/1988 | Keeley et al. | 395/425 |
| 5,058,006 | 10/1991 | Durdan et al. | 395/449 |
| 5,119,485 | 6/1992 | Ledbetter, Jr. et al. | 395/425 |
| 5,251,311 | 10/1993 | Kasai | 395/425 |
| 5,265,229 | 11/1993 | Sareen | 395/425 |
| 5,265,232 | 11/1993 | Gannon et al. | 395/425 |
| 5,287,484 | 2/1994 | Nishii et al. | 395/471 |
| 5,319,766 | 6/1994 | Thaller et al. | 395/425 |
| 5,325,503 | 6/1994 | Stevens et al. | 395/473 |
| 5,333,296 | 7/1994 | Bouchard et al. | 395/425 |
| 5,339,399 | 8/1994 | Lee et al. | 395/425 |
| 5,353,415 | 10/1994 | Wolford et al. | 395/325 |
| 5,398,325 | 3/1995 | Chang et al. | 395/425 |
| 5,426,765 | 6/1995 | Stevens et al. | 395/458 |
| 5,446,863 | 8/1995 | Stevens et al. | 395/427 |
| 5,506,967 | 4/1996 | Barajas et al. | 395/250 |

*Primary Examiner*—Tod R. Swann
*Assistant Examiner*—Tuan V. Thai
*Attorney, Agent, or Firm*—Alfred W. Kozak; Mark T. Starr; Steven R. Petersen

[57] ABSTRACT

By expanding the cache address invalidation queue into bit slices for holding odd invalidation addresses and even invalidation addresses and also by providing a more efficient series of transition cycles to accomplish cache address invalidations both during a cache hit or a cache miss cycle, the present architecture and methodology permits a faster cycle of cache address invalidations when required and also permits a higher frequency of processor access to cache without the processor being completely locked out from cache memory access during heavy traffic and high level of cache invalidation conditions.

5 Claims, 10 Drawing Sheets

FIG. 7A — EARLIER TYPE SEQUENCE — PRIOR ART

FIG. 7B — INVALIDATION WITH CACHE HITS NEW SEQUENCE

CACHE INVALIDATION SEQUENCE SYSTEM UTILIZING ODD AND EVEN INVALIDATION QUEUES WITH SHORTER INVALIDATION CYCLES

CROSS REFERENCE TO RELATED APPLICATIONS

This is a continuation of application Ser. No. 08/093,428 filed on Jul. 16, 1993, abandoned.

This disclosure is related to a co-pending applications U.S. Ser. No. 08/081,048 entitled Mini-Cache Throughput Enhancement System; and U.S. Ser. No. 018,996, "Dual Bus System Providing Compatibility For Store-through And Non-Store Through Cache Memories"; and U.S. Ser. No. 08/092,408 entitled "Coincident Cache Operations With Bit Slice Ability".

The spying activity on a system bus is typical of that described in U.S. Pat. No. 5,025,365 on "Hardware Implemented Cache Coherency Protocol . . . ".

FIELD OF THE INVENTION

This invention relates to processes in a computer system where the invalidation logic presents a minimal impact on the overall system performance.

BACKGROUND OF THE INVENTION

In its generalized form, a computer system consists of one or several processors, main memory, input and output modules and often maintenance modules. The processors execute instructions which are stored in memory and also function to process and manipulate data. The main memory contains data and programs which are accessed by the processors and the input/output modules. The input/output modules permit communication between the peripheral devices (disks, tape drives, printers, modems, etc.). The maintenance module is used to initialize the machine system, to run diagnostics, to determine failures, monitor state of the system, store system information, note errors and take corrective actions. All of these cooperating modules cooperate over a system bus such as is indicated in FIG. 2.

Figure 2:
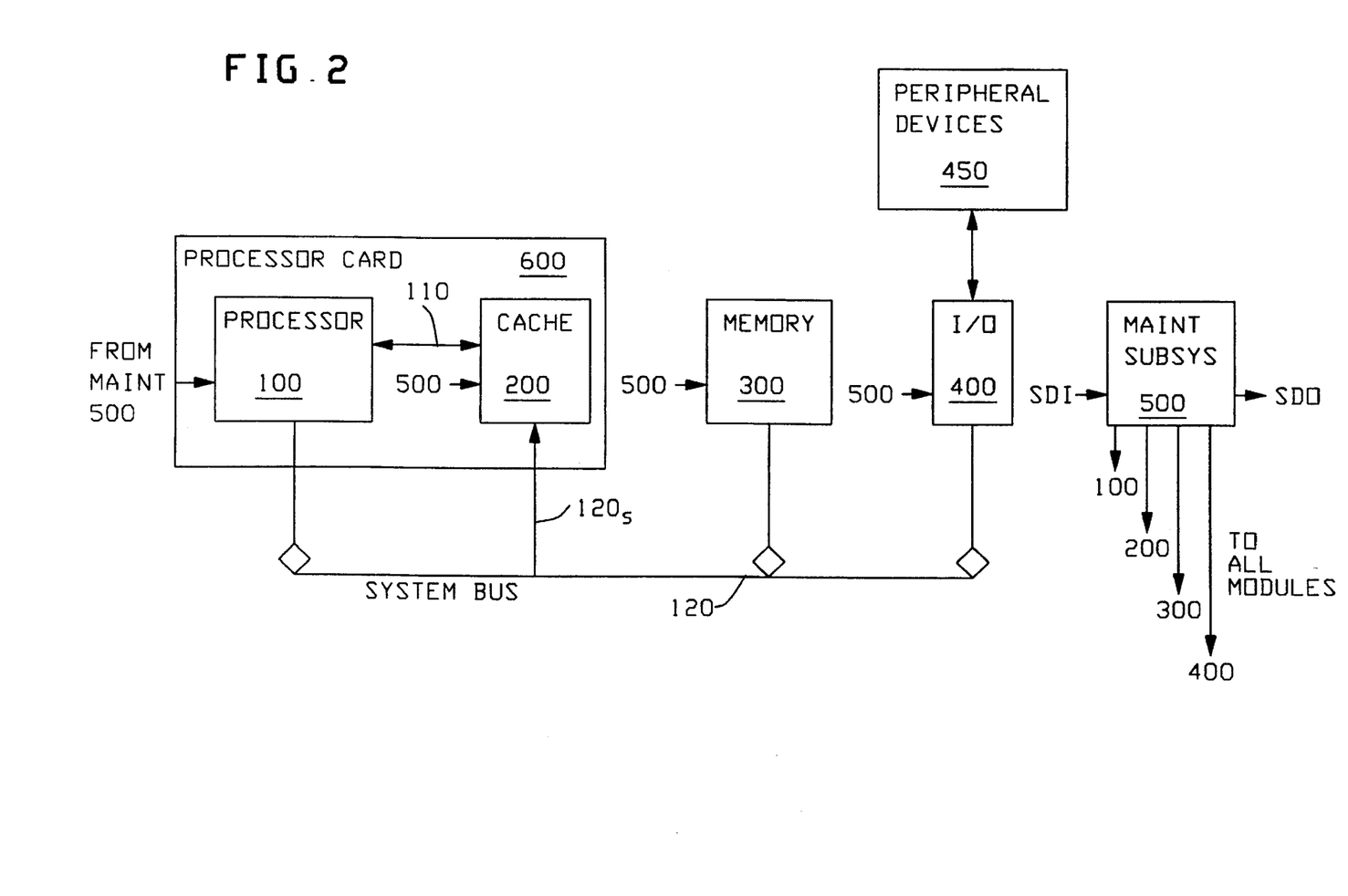
FIG. 2 is a overall computer system block diagram showing the use of the cache memory.

A typical example of such a computer system is indicated in FIG. 2 where a processor card 600 includes a processor 100 connected by an internal bus 110 to a cache unit 200. A system bus 120 connects the processor 100, and the cache 200 to other system modules such as the main memory 300, the I/O subsystem 400 which communicates with peripheral devices 450. Additionally the maintenance module 500 connects to each one of the other modules in order to perform initialization and diagnostic operations.

Each of these modules, being connected to the system bus 120 still operate independently. However, no one module should gain control over the system bus 120 for indefinite on long periods of time since this would limit the access and work of the other modules. Likewise, if any one of the modules on the system bus could not keep up with the data traffic on the system bus, this module would tie up the bus and slow the work of the other modules. One often recurring problem involves the sequences in which a processor module may tie up the system bus 120 and thus impede the system bus traffic with the result of degrading the system performance. It would be most desirable to provide a processor operational sequence which does not impede the system bus traffic, even under the worst conditions, and thus enable a much higher overall system performance.

As the performance capability of any of the modules increases, likewise so does the data traffic on the system bus 120. First considering the I/O module 400, for example, the faster this module handles transactions to the peripheral devices 450, (disks, tape drives, monitoring terminals, etc.) the more Reads and Writes this module will generate to the main memory 300 over the system bus 120.

Likewise, the processor 100 will have a similar impact on the system bus 120. The faster and more capable the processor 100 operates, the more traffic it will generate on the system bus 120 with Read and Write command operations.

Thus, the system bus 120 is most critical to the overall performance of the computer system. And consequently, the bus is designed to operate at the maximum frequency that is technically possible. In any developing new system, it is desired that the system bus be able to operate at the physical limits of the technology available at that period of time.

The process of designing new computer systems has generally become much more complicated and expensive and it is constantly desired that these costs be kept to a minimum. One approach to generate lower development cost is to design the best system bus possible and then use it for several computer systems. The only thing that is changed for each new system is one or two of the cooperating modules at any given time so that an entire new system does not have to be designed for each phase of the computer development cycle. As an example, the Unisys A11-211 computer system manufactured by the Unisys Corporation of Blue Bell, Pa., is a system which has been developed with the characteristics of a high volume system bus which is applicable over a number of computer system developments. For example, this computer has a processor which operates at 12 megahertz and interfaces asynchronously to the system bus which then operates at 16 megahertz.

Then subsequently, with the development of a new processor with a new architecture, the new processor would operate at a higher frequency such as 16 megahertz which would be compatible with the originally developed system bus which operated at that frequency. However, with the new architecture and higher frequency operation, the processor is now be generating much greater traffic than the previous processor. It might be indicated that the new system processor would generate approximately twice the traffic because of its enhanced architecture and design improvements over the earlier computer system. Then it may be indicated that future processors may soon be operating over a 32 megahertz frequency thus quadrupling the traffic on the system bus 120.

An increase in data traffic on the system bus is good for system performance since more work gets done. However, in this case, all modules attached to the system bus then have to be able to handle the maximum I/O traffic generated by any one module, as well as the cumulative traffic of all the modules working independently. Otherwise, the computer system is slowed down to the slowest data processing rate of the slowest module in the system. In this case, the system could not operate at its proper capacity. As an example, it might be considered similar to a well maintained super highway, with several automobile lanes in each direction plus overpasses and ramps. Then under normal traffic conditions, cars could move at speeds of over 60 miles per hour in a safe manner. However, if the quantity of cars increased to a certain threshold level, with cars getting on and off the freeway randomly, the highway would become inefficient and for example, the highway speeds could drop to 30 miles per hour or less which is today something seen very commonly in large cities during the rush hours.

Thus the situation arises in that, as any one of the modules has a performance capability increase, then the other modules need to be capable of handling the extra traffic which is generated. One general approach used is to "over design" the data handling capabilities of each module at the system bus interface. For example, in the previously mentioned Unisys A11-211 computer, the I/O module was "over-designed" to handle the worst case scenario of data traffic. Thus, where previous systems could generate data traffic of eight megabytes per second (eight million bytes per second) the I/O module of the A11-211 system was designed to handle up to 48 megabytes per second or 6 times as much as normal. Thus it was over designed with the idea of future growth for future systems so that the developed I/O module would not have to be designed anew each time a new system was introduced. Thus with the design of a higher capability system designated as the A11-411, the previously designed I/O module would be compatible with a higher capacity system.

Even though the described A11-211 or the upgraded A11-411 systems do not generate a 48 megabyte per second transfer rate on the system bus, it is standard that the system bus be tested at the highest operable frequency. Thus it is tested at "bursts" of 48 megabytes or higher. Thus when the testing of the A11-211 system occurred with a high data traffic rate, it was found that the processor of that system could not keep up with the high input/output I/O data transfer rates known as "bursts". A burst of I/O occurs when the I/O module has sufficient data to Read or Write consecutively to the main memory 300 for long periods of time. The I/O Module 400 does consecutive Reads or Writes as fast as the system bus can handle them.

Typically, in the A11-211 system, the I/O module could do typically 250 back-to-back Reads or Writes, with each Write occurring every 14 clocks. In a maximum type configuration, there are two I/O modules 400 (FIG. 2). Therefore, on the system bus 120, the cumulative traffic would be twice the amount of back-to-back Reads and Writes, that is to say, two Writes every 14 clocks which is equivalent to one Write every 7 clocks.

The earlier A11-211 processor could not "spy" on the system bus and still sustain the 500 consecutive Writes. This early processor would issue "RETRYS" causing the I/O module 400 to stop and then repeat the Write operation later. Then at a later time, the processor, which may have caught up, would then be ready to spy on the system bus again. Once "RETRYS" start occurring, the system bus traffic stops significantly, similar to the rush hour on a highway where incoming cars have to wait at the on-ramps. The situation of using the "RETRY" operation in a computer system has been described in a co-pending application U.S. Ser. No. 961,744 and entitled "Programmable Timing Logic System For Dual Bus Interface" which has been allowed.

The "traffic problem" caused by the earlier processor of the A11-211 system occurred because the processor 100 and the system bus 120 were sharing a common resource which was the cache memory 200 seen in FIG. 2. Here it is seen that the processor 100 interfaces over an internal bus 110 to the cache memory 200. Also, it is seen that the system bus 120 interfaces to the cache memory via bus 120$_s$. The cache 200 is a fast memory and contains a subset of the locations in main memory 300. Each time the processor 100 issues a Read or a Write, the cache memory 200 checks to find out if it contains the data internally. If the cache does contain the requested memory location, it is a cache "hit" and the data requested is then returned, on the next clock, to the processor 100. If the cache memory 200 does not have the data, this is a cache "miss". In this case of a "miss," the processor 100 has to then access the system bus 120 and get the data from the main memory 300, however, this extra step is much slower taking 8 or 9 more clock time periods.

As indicated in the aforementioned co-pending application U.S. Ser. No. 018,996 entitled "Dual Bus System Providing Compatibility For Store-Through And Non-Store-Through Cache Memories", now abandoned, there are two types of cache memories, "store-through" (ST) and the "non-store-through" (NST). The store-through cache memories operate in a mode such that whenever the processor 100 issues a Write command, the Write data is sent to the cache 200 as well as the main memory 300. However, in non-store-through (NST) cache memories, the Write commands and data are sent to the local cache 200 alone and not to the main memory 300. Thus, the data in the cache memory 200 might possibly be different from the data residing in main memory at any given time, leading to a period of non-coherency.

The non-store-through cache memories are more complicated to control in system operations than are the store-through cache memories. The cache memories in both the earlier A11-211 and the upgraded A11-411 are "ST" (store-through) cache memories.

The purpose of the cache memory, such as cache 200, is to provide data to the processor on a very quick basis. Additionally, another main task of the cache is to maintain "data coherency", that is to say, that the data in the cache 200 has to accurately match the data residing in the main memory 300. As an example, when the I/O module 400 does a Write of data on the system bus 120, that means that now the main memory has received the "latest" data. In this situation, the cache memories 200 in the processor card 600 will then need to invalidate the address location in the cache memory that was written to the main memory by the I/O module. The cache memory 200 maintains the main memory address within itself of the word which corresponds to the same main memory address of that word.

Due to the fact, that at certain times, the cache memory holds inaccurate data from that residing in the main memory 300, then the cache provides a "invalidation queue" to hold the invalidation addresses which were (of the word addresses being updated) derived from spying on the system bus 120. The cache memory 200 itself does the invalidation operation in between its service to the processor 100. However, during high data traffic on the system bus 120, the invalidation queue (260 FIG. 1) can get full. Thus, the cache 200 will be seen to have two requestors which are the processor 100 and also the system bus 120 in order to perform the invalidation operation. These two requestors can also be seen in FIG. 2 where the processor uses the internal bus 110 to access the cache while the system bus uses its separate spur line 120$_s$ to access the cache 200.

However, while the processor 100 is doing a Read or a Write operation, the cache memory 200 cannot do any invalidation operations. And similarly, while the cache memory is doing its invalidation operations, the processor 100 cannot access the cache memory 200. Thus, if the I/O traffic were high enough to keep the invalidation queue (260 FIG. 1) constantly filled, the processor 100 would never be able to access the cache memory 200 and no effective work could be accomplished. On the other hand, if the processor 100 were constantly accessing the cache 200, then the cache could never fulfill its invalidation operations, and the invalidation queue 260 would fill up and the system bus traffic on 120 would stop.

The earlier A11-211 computer system had a cache memory but under conditions of high data traffic on the system bus, the cache could not operate efficiently, that is to say, the cache memory could not keep up with the invalidation operations required, and thus Write operations had to be retried or repeated on the system bus 120. In trying to fulfill its invalidation sequences, the cache memory blocked access to the processor 100 for long periods of time since the cache could not keep up with the high I/O traffic. This also affected the system bus traffic because, while the invalidation queue was full, the I/O traffic stopped causing a bottleneck to the processor and the system bus.

Thus, with the aspect of an upgraded processor (A11-411) being developed to introduce even more traffic on to the system bus 120, it was seen that the earlier design of the A11-211 processor, (since it could not keep up with the system bus traffic), would lead to even further problems when the upgraded processor was implemented. This was further complicated in that the maximum computer system configuration involved two processors rather than just one.

Thus, it was necessary to provide a design which would overcome these problems and allow the processor or processors to access the cache memory as often as necessary without affecting a slow down on the system bus. Further, from the system bus viewpoint, the cache memory is required to "spy" on the maximum possible I/O traffic without hindering the processor's access to the cache memory. Thus, it was necessary to find some system and operation which would provide the best operation for both of these situations whereby (i) there would be immediate processor access to the cache as well as (ii) immediate access by the system bus to the invalidation queue in the cache memory.

The presently described system provides the required solutions involved to the above described problems by providing processor access to the cache memory and at the same time allowing equitable access by the system bus to the invalidation queue in the cache memory.

SUMMARY OF THE INVENTION

A cache memory in a computer system includes an invalidation queue and cache control-sequence unit where an invalidation queue block can hold up to sixteen invalidation addresses. An invalidation queue control block determines if the queue block can accept any invalidations, or if it is full, to stop accepting invalidation signals. A sequencer circuit does the invalidation checking and the invalidations. It provides a series of sequential steps where the invalidation sequence has been optimized so that the invalidation cycle is reduced by at least one clock time from an earlier type of sequence.

The invalidations are done in two cache slices where one slice does the odd addresses and the other slice does the even addresses while both slices can complete the invalidations in parallel. By using an improved timing sequence and slicing the cache memory, two addresses can be invalidated every three clock times in case of the "hit" and two addresses can be invalidated every two clock times in case of a "miss".

Thus an improved sequence algorithm combined with the slicing the cache memory results in a much higher bandpass during invalidations with cache hits and a much higher bandpass for invalidations with cache misses.

The present invention describes a highly efficient sequence cycle which allows two independent requestors in a computer system (the processor and the invalidation logic module) to access a common resource in the cache memory module. This resource is designated as the Tag RAMs, and operates without affecting the processor's system performance or without affecting the I/O traffic on the system bus.

Earlier cache invalidation systems blocked the processor operation and the operation of the I/O modules because the invalidation sequence for the cache memory module was slow or inefficient.

The present system and architecture permits cache invalidations to be performed with the least number of state sequential changes, and even though the window for processor operations to access the cache memory has been narrowed, the processor is still given access to the cache much more often thus preventing any hindrance to processor access to the cache memory.

The overall system design can now sustain processor requests to cache memory as well as invalidation requests to cache memory even during the most heavy traffic conditions on the system bus and the variously connected modules.

BRIEF DESCRIPTION OF THE DRAWINGS:

FIGS. 6 A, B, C and D show a series of flip-flops used in the improved invalidation sequencing operation cycle;

DESCRIPTION OF PREFERRED EMBODIMENT

Figure 1:
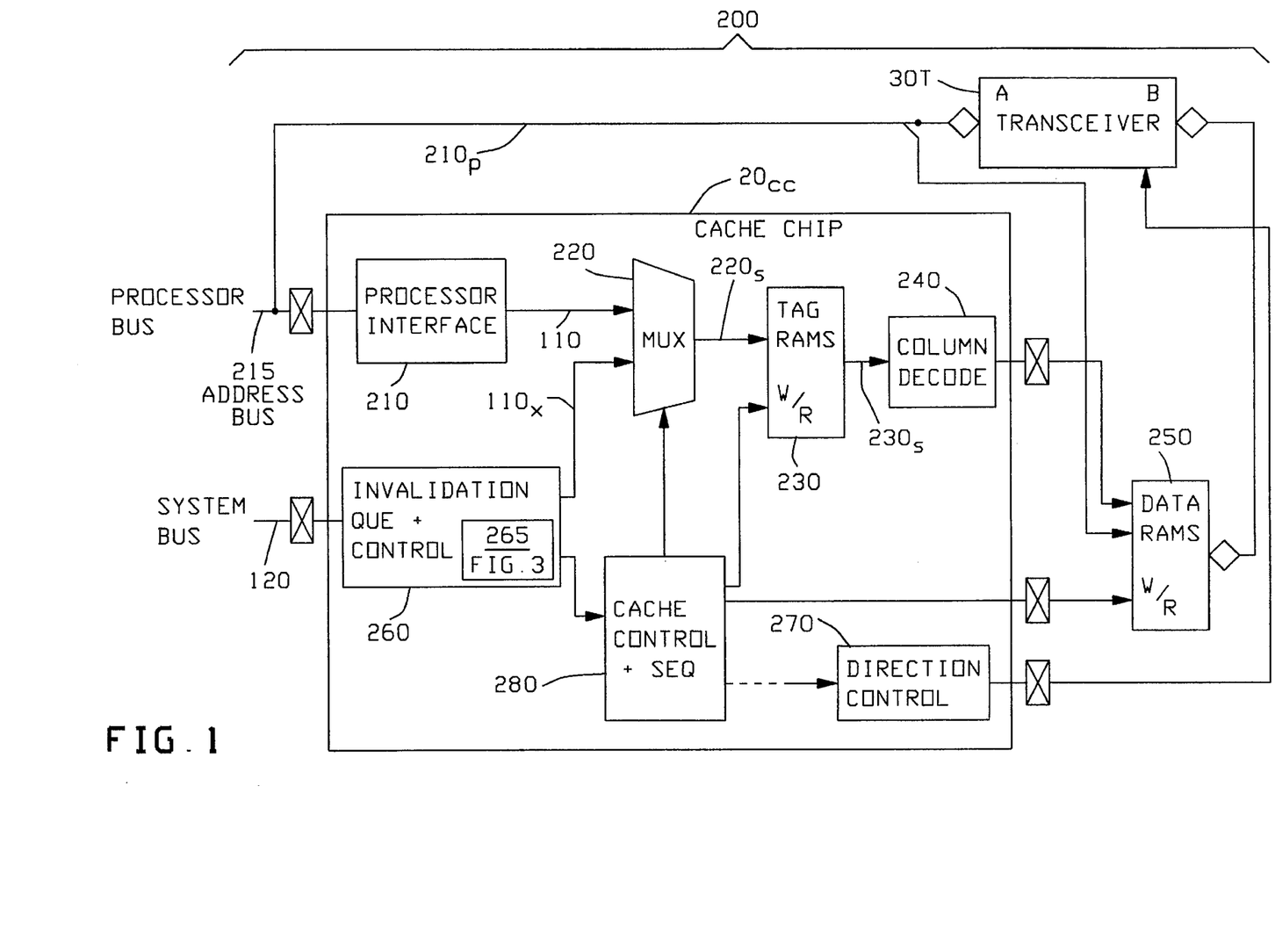
FIG. 1 is a diagram of the presently described improved cache module showing the cache chip and the data RAMs.

The cache module 200 is shown in FIG. 1. A cache chip $20_{cc}$ includes a processor interface 210, and an invalidation queue-control circuit 260, which respectively receive inputs on the processor bus 215 and from the system bus 120. The processor interface 210 accepts requests from the processor 100. The processor interface 210 provides an output to the MUX 220 (multiplexor) which also receives an input from the invalidation queue 260. The cache control and sequencer unit 280 controls the multiplexor 220 and also provides a Read/Write input to the tag RAMs 230. The multiplexor 220 also provides an input to the tag RAMs 230. The tag RAMs 230 provide an output to the column decode unit 240 which provides an input to the data RAMs 250. The cache control and sequencer unit 280 provides a Read/Write input to the data RAMs 250.

A transceiver 30T is controlled via Direction Controller 270 to either send requested data from RAM 250 via bus $210_p$ to processor 100 or to let Data RAM 250 receive data on bus $210_p$.

Thus, transceiver 30T can isolate bus $210_p$ from RAM 250 or else allow bus $210_p$ to Write data into RAM 250.

The logic in the Data RAMs 250 is implemented to be in the "Read" mode by default. Thus, the only task left to do is to enable the transceiver 300 via the Direction Controller 270.

Referring to FIG. 1, the processor issues command operations and a requested address via the processor bus 215. The address gets latched at the processor interface 210. When the sequencer in the cache control block 280 determines that the block 280 can service the processor 100, then the cache control sequencer allows the requested address to go through the multiplexor 220 over to the Tag RAMs in block 230. If there is a "hit" in the Tag RAMs 230, that information is decoded by the column decode unit 240 to generate the rest of the address for the data RAMs 250 which then returns the data word to the processor over the internal processor bus 215, via bus $210_p$ (FIG. 1).

The system bus 120 operates in a similar fashion. The address "spyed" from the system bus 120 is sent to the invalidation queue-control block 260. The cache control-sequencer block 280 provides the invalidation sequencing operation and it accesses the Tag RAMs 230 through the multiplexor 220. The cache control-sequencer 280 checks to find out if the Tag RAMs 230 has the address or addresses received from the system bus 120. If the Tag RAMs 230 does not have the address, it does not do anything but return to an idle condition. However, if the Tag RAM 230 does have the address, it has to provide an invalidation operation and then return to its idle condition.

Figure 3:
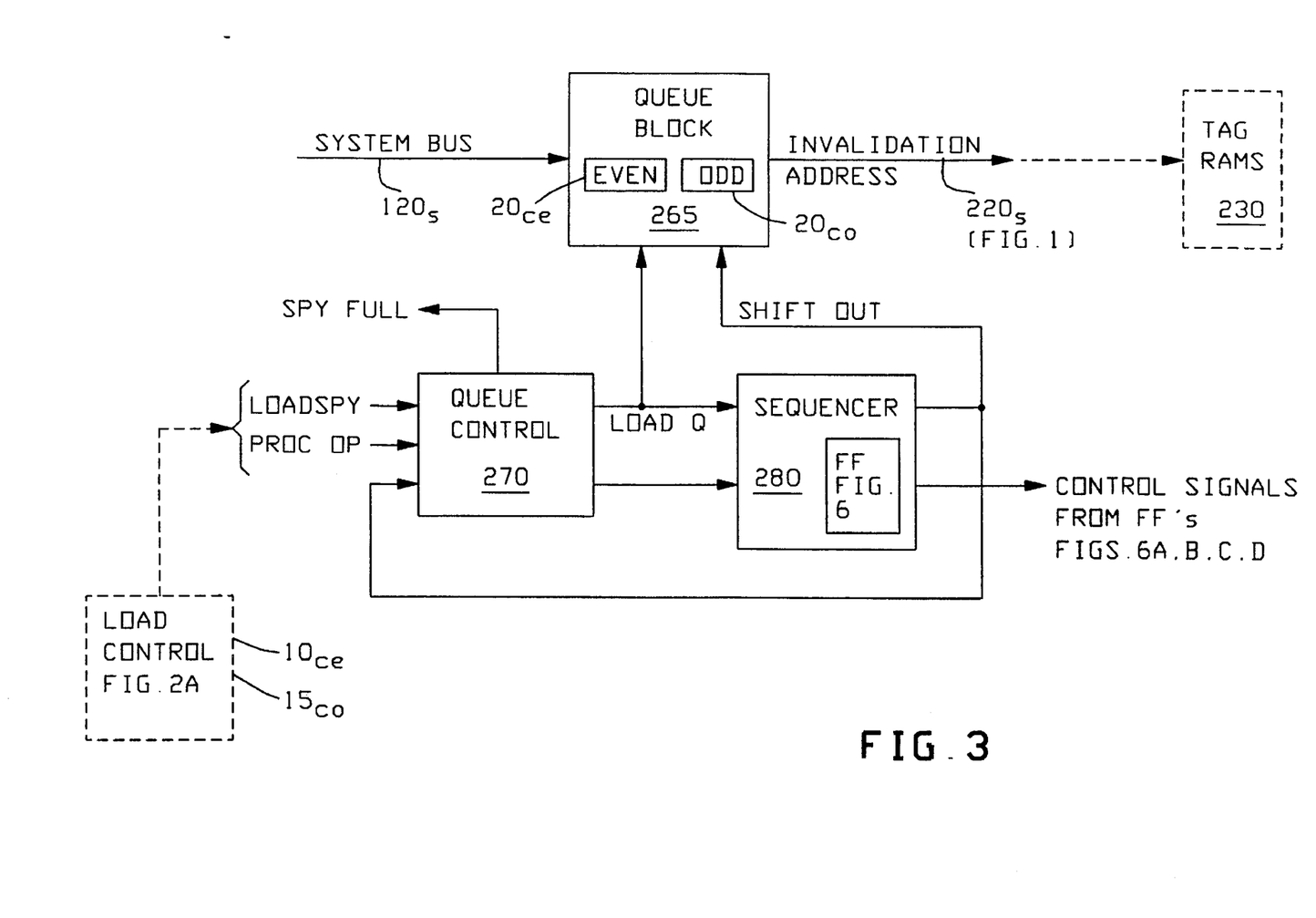
FIG. 3 is a diagram showing the invalidation queue and sequence control units of the cache memory module.
Figure 4:
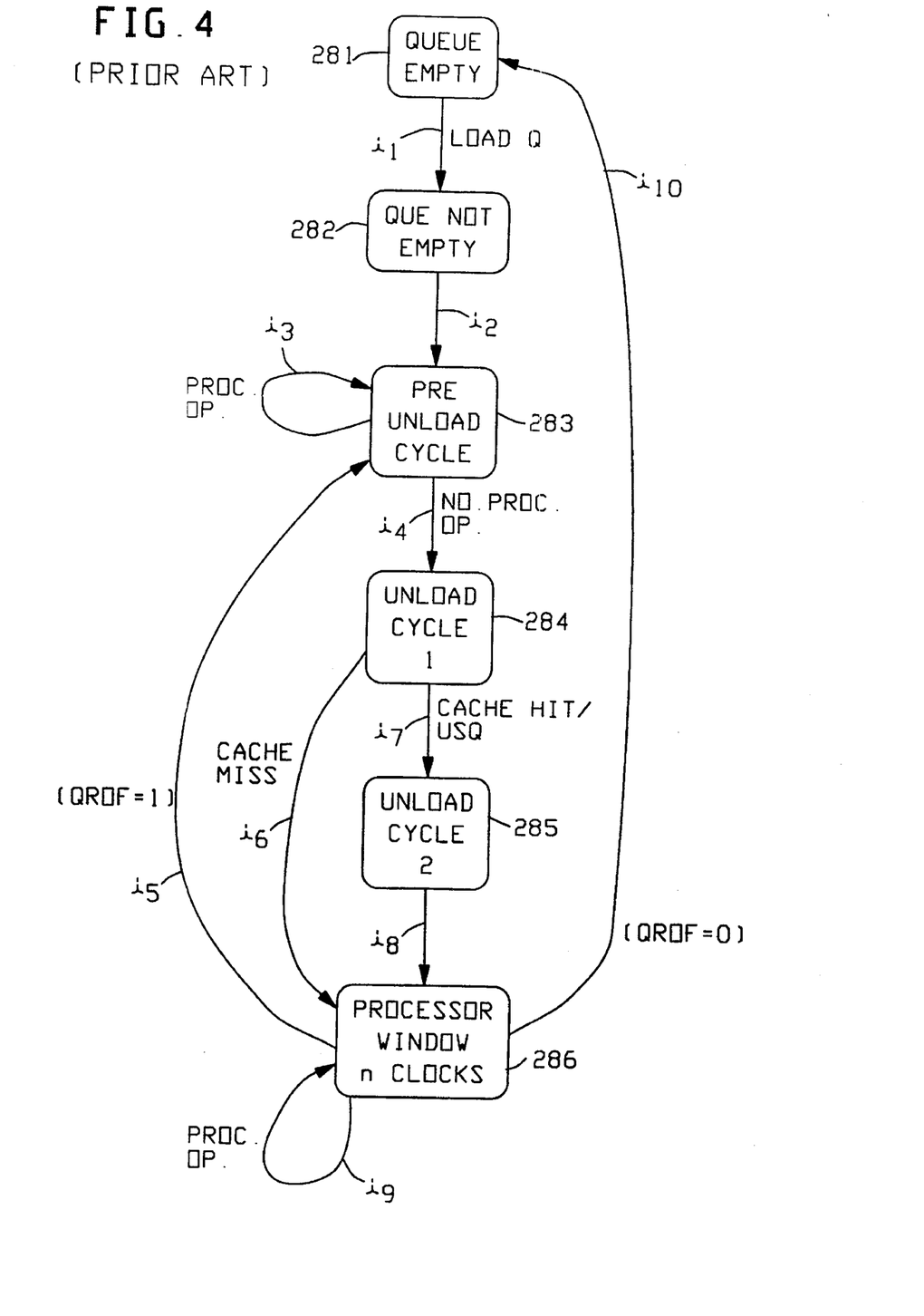
FIG. 4 is a sequence diagram showing how the invalidation sequence was handled in an earlier design.
Figure 5:
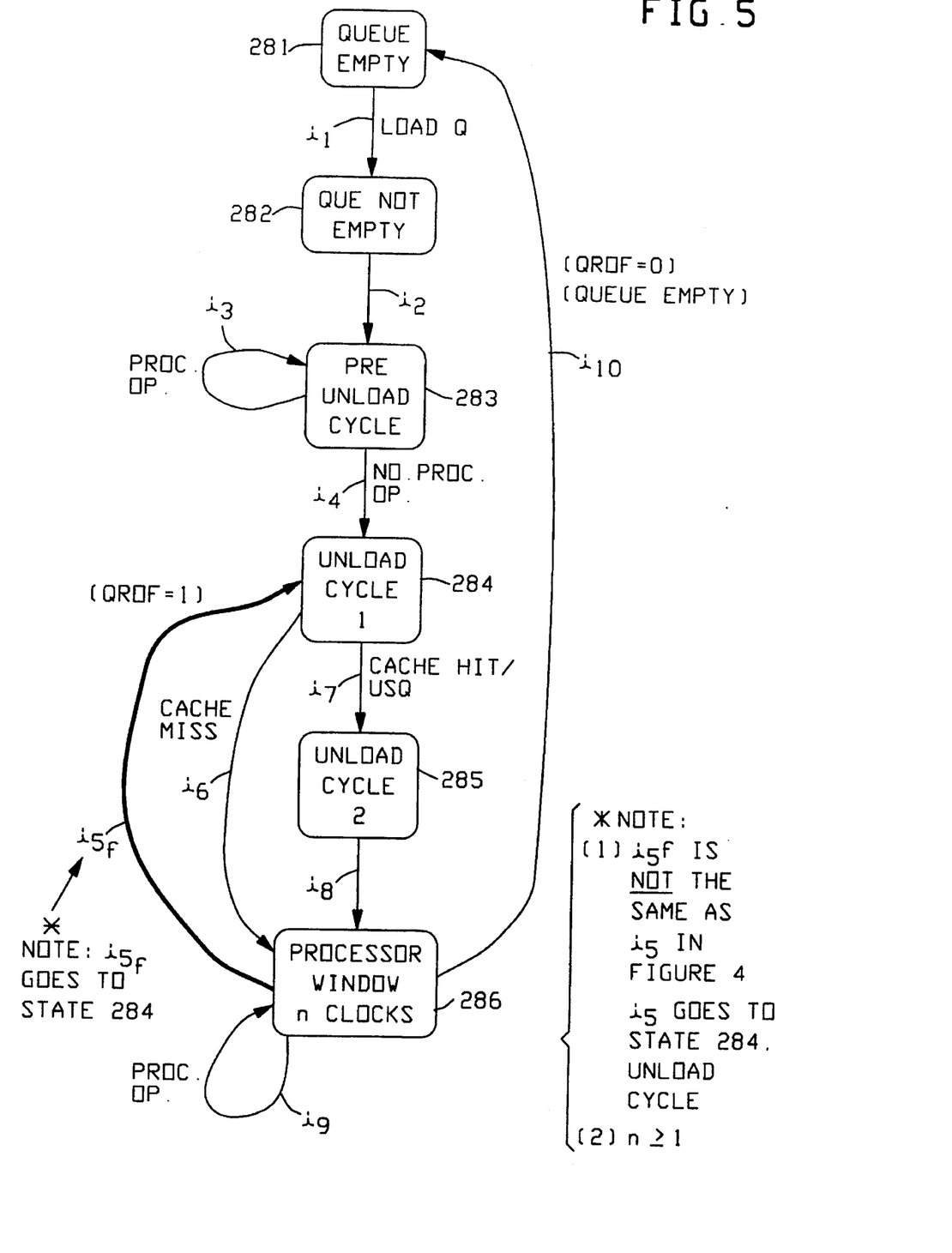
FIG. 5 is a sequence state diagram showing how the invalidation operation is done in a more efficient manner.

The invalidation queue-cache control circuit 260 in FIG. 1 is seen in more detail in FIG. 3. The queue block 265 can hold up to 16 invalidation addresses. The queue control block 270 determines if the queue block 265 can accept any more invalidations or, if it is full, to stop accepting invalidation addresses. The sequencer circuit 280 does the invalidation checking and the invalidation operations. The sequencer 280 provides the major improvements in the invalidation sequence operations. FIG. 4 is a flow chart showing sequencer operations as was previously done on earlier designs while FIG. 5 shows the improved operations of the new sequencer functions.

Figure 2A:
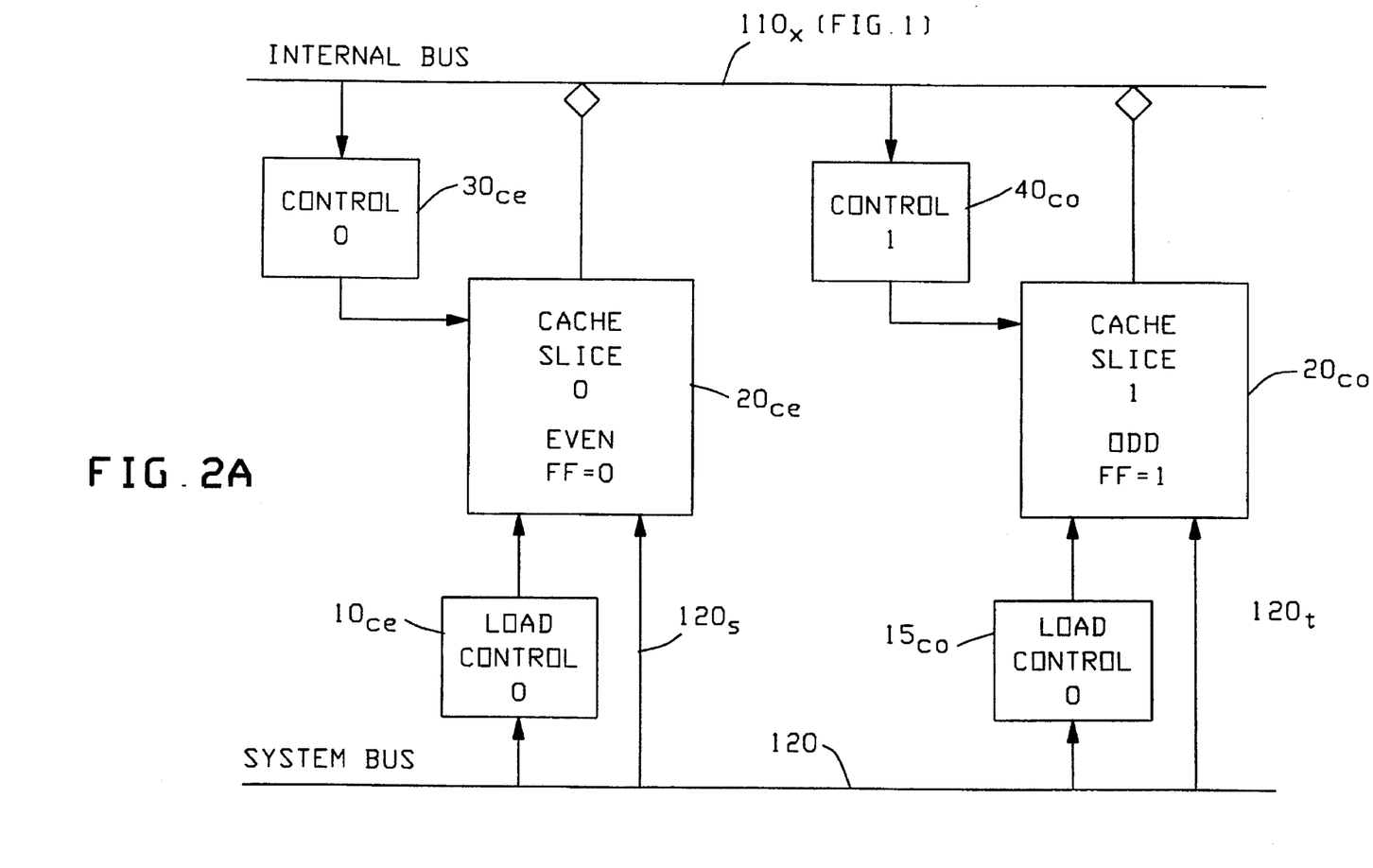
FIG. 2A is a diagram showing the cache slices for holding "even" and "odd" addresses.

The invalidation address queue 265 FIG. 3, of the cache chip $20_{cc}$ of FIG. 1 is implemented in two phases for "even" addresses $20_{ce}$ and for "odd" addresses $20_{co}$. A flip-flop setting to "0" or "1" determines the usage. This is seen in FIG. 2A.

Each cache slice $20_{ce}$ and $20_{co}$ receives control signals from load controllers $10_{ce}$ and $15_{co}$. The system bus 120 feeds these slices via bus extensions $120_s$ and $120_t$.

The internal processor bus 110 feeds controllers (0=odd and 1=even) $30_{ce}$ and $40_{co}$.

The two slices are identical inside for both even and odd addresses. However, each slice has a flip-flop which identifies the slice as even or odd. The identification flip-flop enables the invalidation queue block (265 of FIG. 3) to behave as odd $20_{co}$ or even $20_{ce}$, FIG. 2A. Therefore, the invalidation address leaving the queue block 265, FIG. 3, in the case of an odd slice would be odd addresses only. For example, assume that a block address, "8," is loaded to be invalidated. Thus, Slice 0, $20_{ce}$ would invalidate addresses 8 and 10. Slice 1, $20_{co}$ would invalidate addresses "9" and "11".

FIG. 4 is a flow chart indicating an earlier design algorithm which was used to process invalidations in the cache but which operated in an inefficient manner. As seen in FIG. 4, a series of "state numbers" are used to indicate various steps. The invalidation sequence started with the "queue empty" state 281. After the first invalidation address arrived, it would go to the next state "queue not empty" state 282. On the next clock, the sequence automatically went to the "pre-unload cycle" state 283. The pre-unload cycle is a state to get ready to do an invalidation, but if the processor needs to access the cache memory, the processor "wins" in this state, as per loop i3, and the invalidation sequence has to "wait"; then the sequencer remains in the pre-unload state cycle state 283 until the processor finishes with its operation as indicated at (i3). Thus the (i3) condition starts in the pre-unload state and returns to the pre-unload state as long as the processor is accessing the cache or accessing main memory in case of a miss. While in the pre-unload cycle, 283, if the processor finishes its cycle of operation or the processor is not accessing the cache, then the sequencer moves to the next state "unload cycle 1", state 284, as indicated at (i4).

In FIG. 4, during the unload cycle 1, state 284, the sequencer checks to determine if the address (which needs to be invalidated) is in the cache by checking the Tag RAMs 230. From the unload cycle 1 state 284, there are two possible paths for the next state. One of these paths (i6), is the cache miss path, which will be discussed hereinafter.

If the address is in the cache memory, then it is a cache "hit" seen at i7 and the sequencer of FIG. 4 goes to the next state "unload cycle 2" state 285. Then it proceeds to the next state called "processor window" state 286. This is an idle state where the processor is allowed to access the cache memory if necessary seen via loop i9. If the processor accesses the cache, then the sequencer stays in the state 286 "processor window" for n clocks until the processor finishes its cycles.

If it were the case of a processor data "hit", this takes only 2 clocks, that is to say n=2 clocks. If it is a "miss", n is on the average of about 8 to 10 clocks. When the processor finishes its operation, if there are still invalidations left in the cache invalidation queue, this is controlled by the Queue Register Occupied flip-flop, QROF, FIG. 6A being set to a "1" and the sequencer returns to the pre-unload cycle state shown by the state transition line i5 which returns back to the pre-unload cycle state 283. Then the invalidation cycle repeats itself by transitioning from state 283 to state 284 to state 285 to state 286.

The other transition previously mentioned as the "cache miss" shown at i6 is from the unload cycle 1, state 284, over to the processor window state 286. This transition occurs when the address in the invalidation address queue 265, FIG. 3, is not found in the cache, that is to say a cache miss, and thus no further action is necessary in the cache module.

Each transition in the sequencer takes at least 1 clock, that is to say, in FIG. 3 the sequencer 280 operates on the basis of 1 clock per sequence transition. What is of particular interest in this sequence, is from the pre-unload cycle state 283 over to the processor window, state 286. The fastest method that this sequence could be accomplished in the earlier design was 4 clocks, in the case of a cache hit, and 3 clocks in the case of a cache miss. Thus the state sequence for invalidation with a cache "hit" was through states 283, 284, 285, 286 and back to 283, since more queue addresses need to be used for invalidation cycles. This took a minimum of 4 clocks with no processor requests. Similarly, for invalidations with a cache miss, the state flow was 283, 284, 286, and back to state 283 thus taking 3 clocks for the invalidation cycle.

Referring to the new invalidation sequence illustrated in FIG. 5, it will be seen that working from state 286 (which is the processor window) if there was "no processor request", then the next state is the unload cycle 1, state 284. This will be seen to reduce the invalidation cycle by 1 clock. The transitional state flow for "invalidations with hits", are the states 284, 285, 286, and returning back to 284. This newly developed algorithm only takes 3 clocks in order to repeat itself. Also, the invalidation cycles with cache misses (i6) only takes 2 clocks to repeat. This involves going from the state 284 (unload cycle 1) through the cache miss channel (i6) to the processor window 286 and return on the channel i5f back to the unload cycle 1 at step 284.

The difference between the prior technique and the newly developed sequence is in the state transitions. In the older technology the channel (i5) in FIG. 4 operates from the state 286 through the channel i5 to the pre-unload cycle at state 283. This is done through the (i5) channel using the queue request occupied flip-flop of FIG. 6A. This prior algorithmic sequence gave the processor at least a two-clock window in order to access the cache. Now contrarily in the newly developing sequencing cycles, the state transition channel i5f goes to the unload cycle 1 at the state number 284, just after the state 286 (processor window) and just giving a minimum of 1 clock window (i9) for the processor to access the cache. In this manner there is a saving of 1 clock for each invalidation request with a cache hit or without a cache hit. As a result there is a great improvement in the cache invalidation cycle bandpass.

If the processor activity is ignored, this newly arranged sequence with its improved bypass, permits 32 megabytes per second for invalidations with cache hits and with 48 megabytes per second for invalidations with cache misses. This alone is a great improvement over the old system. However, a further improvement was deemed desirable and necessary and was provided for greater enhancement. This had to do with dividing the operations into two cache slices where one slice does odd addresses and the other slice does the even addresses and also both these slices can do invalidations in parallel. Thus the queue block 265 of FIG. 3 is divided into two sections, one of which holds odd addresses and the other holds even addresses. Under these conditions by doing the improved sequence operations and also slicing the cache (queue block 265) two addresses can be invalidated every three clocks in case of a cache hit and further two addresses can be invalidated every two clocks in the case of a cache miss.

Figure 7A:
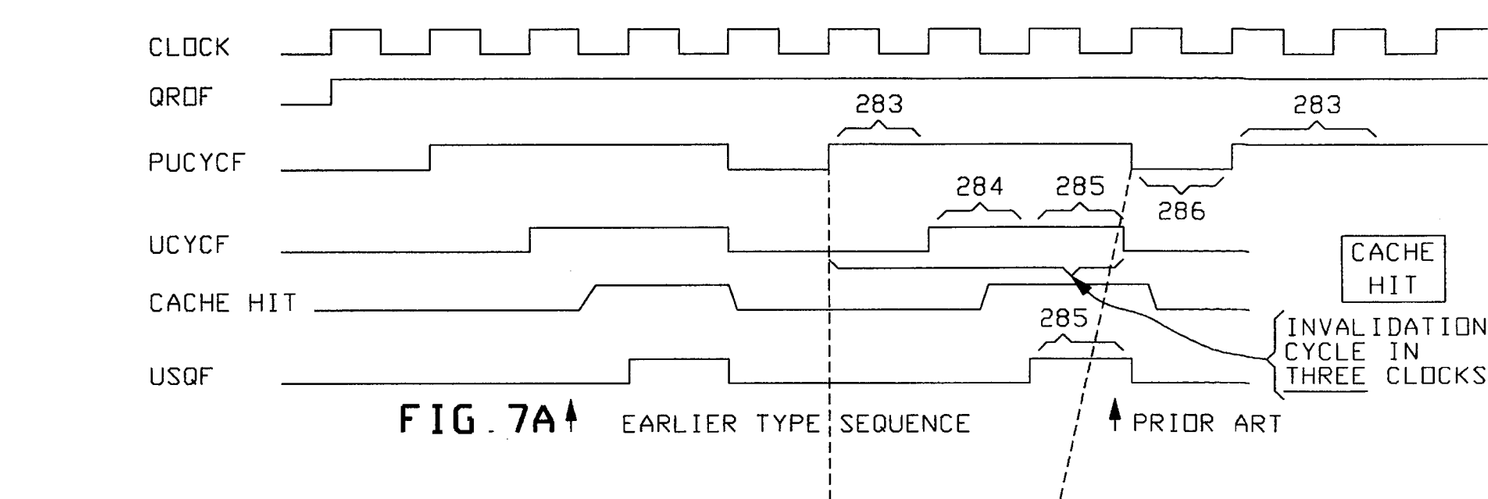
FIG. 7A is a timing diagram of the invalidation operation in the prior art sequence with cache hits.
Figure 7B:
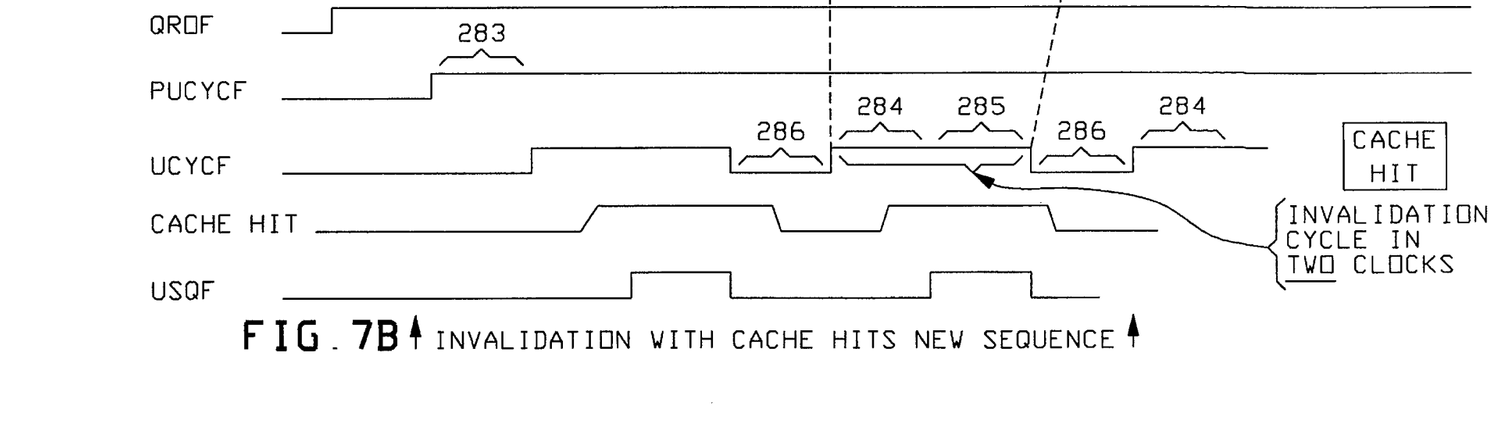
FIG. 7B is the invalidation sequence with the new improved cache sequencing system when cache hits occur.

The operation of these state sequence transitions can be seen in FIGS. 7A, 7B, and also 8A, and 8B. Thus FIG. 7a shows the prior sequence of transitions from states 283, 284, 285, 286, and back to 283. Referring to FIG. 7B, the new system shows the improved condition for the state sequences 283, 284, 285, and 286, showing the invalidation operations with "cache hits". It will be noted that the sequence 286 will be completed at least 1 clock cycle time earlier in FIG. 7B then it has in FIG. 7A which is the prior sequential arrangement.

Figure 8A:
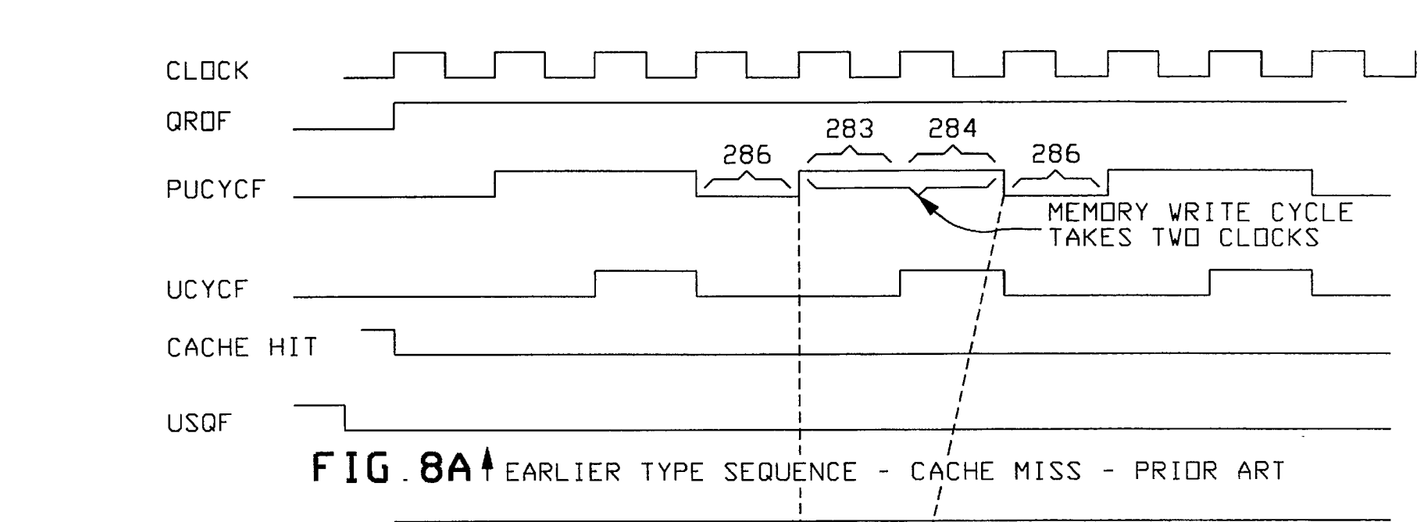
FIG. 8A is a timing diagram of the prior art invalidations with cache misses.
Figure 8B:
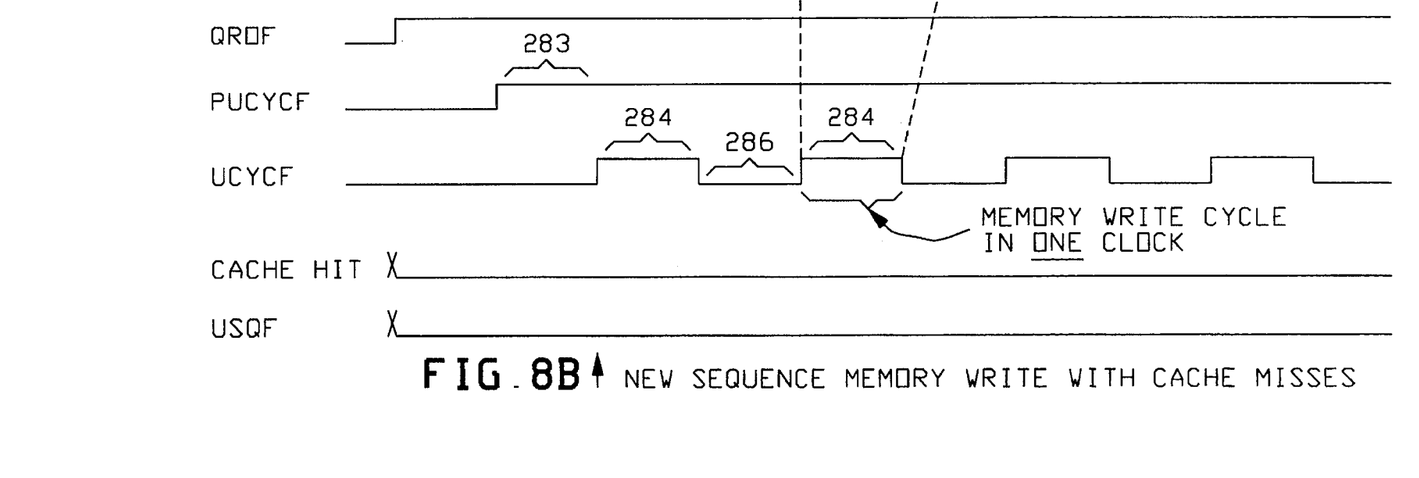
FIG. 8B is the new and improved sequence for invalidations with cache misses.

Likewise in FIG. 8A, which shows the invalidations with "cache misses" where the earlier sequences are shown for states 283, 284, and 286 whereas in FIG. 8B, the new improved sequence shows the processor window state condition 286 to be completed at least 1 clock time earlier than the previous sequence shown in FIG. 8A.

Figure 6A:
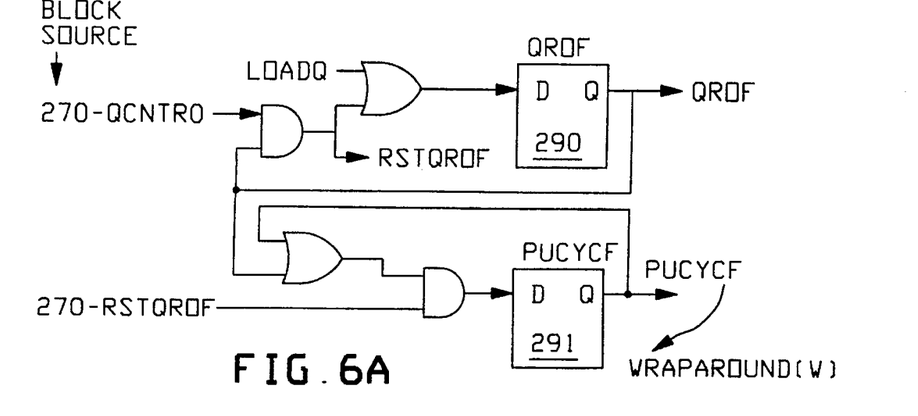

Thus these FIGS. (7A, 7B for "cache hits"; 8A, 8B for "cache misses") will illustrate that the newly developed invalidation sequence is considerably more efficient, in that once the pre-unload cycle is entered at state 283, it is remembered by leaving the pre-unload cycle flip-flop "on" (shown in FIG. 6A as PUCYCF). Thus this state is never entered again as long there are invalidation addresses pending in the queue block 265 of FIG. 3. There is a saving of "1 clock" in between each invalidation sequence.

In prior systems, the maximum bandpass that the invalidation sequence could process, during invalidation cache hits, was one address every four clocks. The one address represents one word of data. One word is 6 bytes, and the clock has period of 62.5 nanoseconds (16 Megahertz) therefore the bandpass can be calculated by taking the 6 bytes and dividing this by the 4 clocks and dividing this again by the 62.5 nanoseconds which gives a result of 19.2 megabytes per second. This would be the maximum bandpass "the invalidation sequencer" can handle without the processor coming in to make requests.

It is necessary at this point to consider the case with the processor in action and making requests where, on average, it would access the cache memory every 8 clocks. Since the hit rate in the cache is approximately 90%, then there of course are misses 10% of the time (wherein the processor then has to access main memory). During the main memory access, the cache is unable to do any invalidation sequences. Then taking all factors into account, in this situation, the bandpass can then drop to 8 megabytes per second. This is considerably less than what the I/O module can generate in its rate of 48 megabytes per second. Thus the earlier art presented a problem since the invalidation sequence operation was not matched to the system bandpass level of the system bus or the I/O module. The system bus had now been slowed down to the slowest module attached to the system bus because of the limitations of the processor's invalidation sequence operation.

With the recognition of this type of problem in the earlier technology, the present architecture and functionality for the processor cache unit was handled in two ways, (a) first the invalidation sequence was optimized once the queue (the invalidation address queue 265) was loaded, (meaning that it had invalidation addresses pending), and (b) the flow of activity was made more efficient.

Thus in summary, by combining the improved invalidation sequence algorithm and also slicing the cache address storage into odd and even addresses, this results in a bandpass of 64 megabytes per second for invalidation cycles with "cache hits" and with 96 megabytes per second for invalidation addresses having "cache misses". While even with processor activity, the bandpass can drop, but only to about 48 megabits per second which is a more acceptable solution for general system operation and efficiency.

Now from these type of developments and the fact that a new high speed processor can process all of the I/O traffic that is possible within the system, then a new I/O module can be designed with a bandpass close to the figure of 96 megabytes per second without the need to redesign the processor itself. Likewise, if a faster processor were to implemented and included in the system, the sequencing mechanism could probably easily handle the extra traffic generated by the processor.

In this case, however, the invalidation sequencing cycles would need to be evaluated where, instead of invalidating "one" address, a "block" of addresses would need to be invalidated. One feature of the I/O module in the improved Unisys A11-411 computer system operates to handle 4-word blocks of consecutive addresses and in this case it would be easily applicable for the cache memory to do the same, instead of handling each word separately and requiring four separate invalidation sequences to purge a 4-word block. Thus it would be an ideal implementation to invalidate a block of four addresses simultaneously, regardless of whether there was a cache hit or a cache miss. In this situation, this could increase the bandpass to 192 megabytes per second.

FIGS. 6A, 6B, 6C, 6D illustrate the specialized flip-flops used to energize the states in the new sequencing operation cycle. These flip-flops are located in sequencer 280 of FIG. 3.

FIG. 6A illustrates the QROF flip-flop which is the queue request occupied flip-flop. This flip-flop stores the condition that there are invalidations pending in the invalidation queue 260 of FIG. 1 and in the queue block 265 of FIG. 3.

Figure 6B:
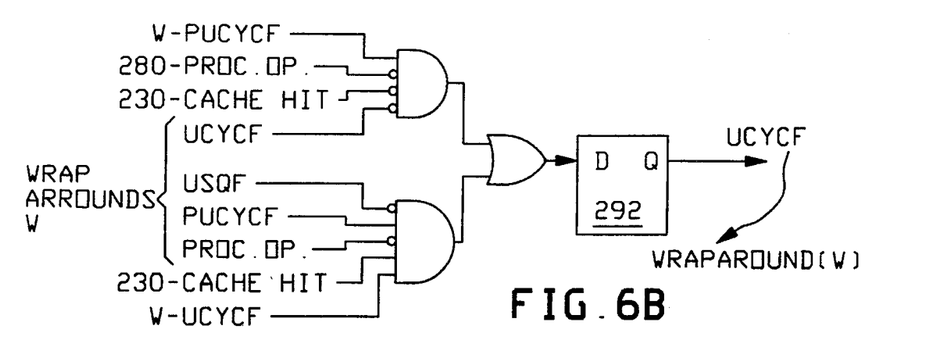

In FIG. 6B the pre-unload cycle flip-flop PUCYCF is used to take an extra clock to allow the first invalidation address value to ripple through the invalidation queue block 265 and this uses a FIFO data register structure. The operation of this flip-flop is seen in FIGS. 4 and 5.

The unload cycle flip-flop, UCYCF in FIG. 6B is used to do the invalidation operation. It stays "on" for one clock in the case of a cache miss and stays on for two clocks in the case of a cache hit. This is shown at states 284, 285 of FIGS. 4 and 5.

Figure 6C:
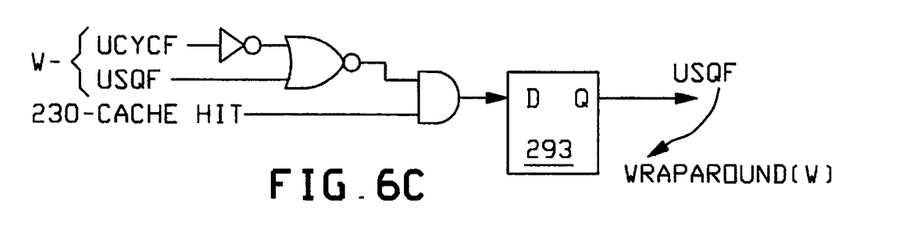

In FIG. 6C, there is seen the unload sequence flip-flip, USQF which is "on" when the tag RAMs 230 detect a cache hit during an invalidation cycle. This flip-flop then will reset the unload cycle flip-flop of FIG. 6B. This flip-flop is used to transition state 284 to 285 in FIGS. 4 and 5.

Figure 6D:
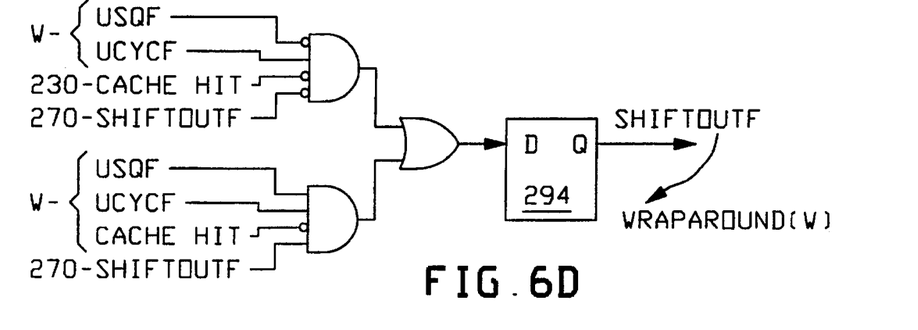

In FIG. 6D, the shift-out flip-flop, SHIFTOUTF, is used to shift the next invalidation address from the invalidation queue block 265 out of the block 265 over to the invalidation address bus $220_s$ of FIG. 3. This flip-flop operates for one clock period.

The sequence line (i10) in FIG. 4 indicates that once the invalidation queue 260 (FIG. 1) has been cleaned out, there is no longer any need for the invalidation sequence and the sequence is now at idle.

Likewise for FIG. 5 the channel transition on i10 from state 286 on to state 281 shows the idle condition at state 281.

Figure 9:
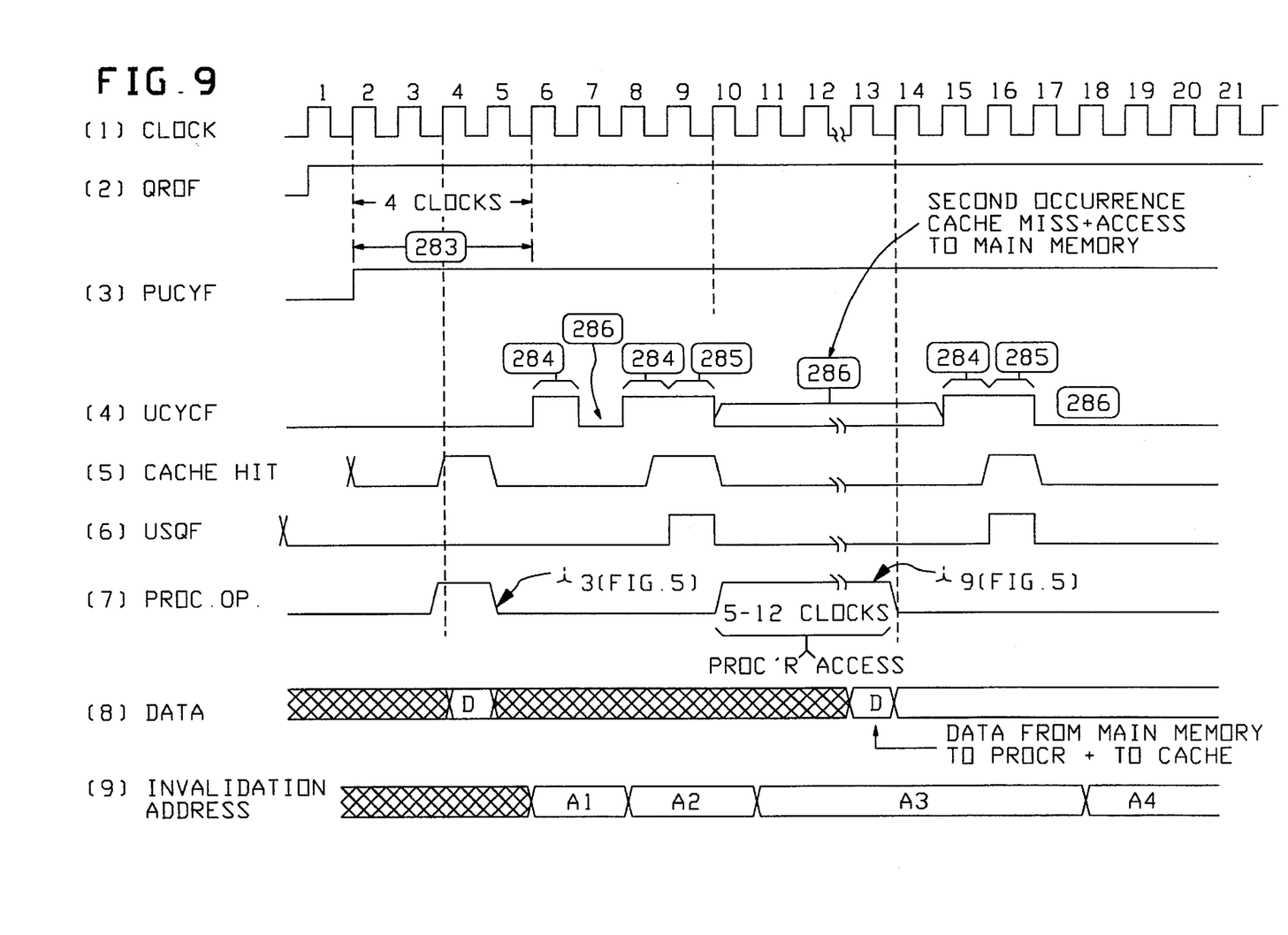
FIG. 9 is a drawing illustrating the sequence of invalidation and permission of processor access to the cache with the use of the new improved system.

In FIG. 9, the loops (i3) and (i9) of FIG. 5 are processor opportunity operations. During state 283 and during state 286, the processor has the opportunity, (line 7 of FIG. 9) if needed, to access the cache memory module 200.

Referring to FIG. 9, at the first occurrence of state 286, the processor did not access the cache module 200. However, in clock #4 (line 1, FIG. 9) the processor did get access (line 7) to cache. This also was a cache "hit" (at line 5 on clock #4). The clock numbers in line 1 (FIG. 9) are shown appearing at the "rising edge" of the clock period. The data (D) is returned on clock #5 (line 8).

At the second occurrence of state 286, the processor does get access to cache (clock #11). This time, it is a cache "miss" and the Cache Hit line 5 is low during clocks #11 through 15 during the time period of State 286. The data D (line 8) coming from main memory 300 is seen at clock #14 on line 8.

FIG. 9 is a drawing showing a typical operational state flow of the newly developed sequencer cycle. In line 4 of FIG. 9 showing the UCYCF (unload cycle flip-flop), it will be noted that the second occurrence of state 286 shows a processor access period during a cache miss operation where the processor and the cache have to wait for the data to arrive from main memory 300.

Line 9 of FIG. 9 shows how certain addresses are invalidated such as address A1, address A2, and address A3, and address A4, which are invalidated in subsequent periods of time.

In FIG. 9 line 4, it is seen that the state 284, 285, and 286 each occupy one clock period. The second "286 transition" will be seen to occupy 5 clock periods, and may vary from 5–12 clocks depending on the speed of main memory 300.

In FIG. 9 at line 3, it is seen that the pre-load cycle flip-flop, PUCYCF at state 283, will stay on as long as QROF is "on" at line 2.

At FIG. 9 line 7, it will be seen that the processor operations for access to the cache (i3 or i9 time transition period, FIG. 5) can fall within a period of 4 clocks while the subsequent or second 286 state (processor window) can take up a period of 5 clocks or more.

There has been presented herein a new and improved invalidation sequence algorithm together with a sliced architectural system for the cache queue block which provides a faster more efficient invalidation sequence thus increasing the computer system bandpass capability and at the same time permits the processor access to the cache memory without hindering cache invalidation operations. In this situation the performance of the processor and the system bus is not slowed down or hindered by the activity traffic on either the processor or the system bus.

While the above described process for cache invalidation sequence activity and cache architecture has been illustrated to enable higher computer system bandpass and eliminate the hindrance to processor access to cache memory, it should be understood that other variations and architecture of the same concept may be implemented but which still are encompassed by the following claims.

What is claimed is:

1. In a data processing system where a processor card holds a central processor and cache memory means each of which connects to a system bus communicating with a main memory, an I/O module and other digital modules, a cache memory invalidation sequence system comprising:

(a) means for enabling said processor direct access to a Tag RAM module of said cache memory means, wherein said means to enable processor access to said Tag RAM module includes:

(a) processor interface means connected to said Tag RAM module via a multiplexor means for enabling access to said cache data RAM;

(b) transceiver means for transferring a data word from said data RAM after a match "hit" in said Tag RAM module;

(c) said multiplexor means, controlled by said sequence control means, for allocating processor access to said cache memory means after said two clock invalidation cycle which involved a cache hit; and one clock period memory updating cycle which involved in cache miss (d) processor address bus means for transmitting addresses to said Tag RAM Module (b) system bus means including:

(b1) connection pathways for said processor, said I/O module and said other digital modules to said main memory;

(b2) a connection pathway to said cache memory means;

(c) said cache memory means including:

(c1) processor interface means connected to said system bus means for directly transmitting processor address requests to said tag RAM module via an access multiplexer means;

(c2) said tag RAM module holding addresses of words residing in a cache data RAM;

(c3) invalidation address queue means for storing addresses residing in said tag RAM module to be invalidated during an invalidation cycle, said queue means including:

(c3a) bus means for directly accessing said tag RAM module via said access multiplexer means;

(c3b) sequence control means for allocating separate clock periods for said invalidation cycles without inhibiting said processor's direct access to said cache memory means; including:

(i) means to execute a cache invalidation cycle in two clock periods on a cache hit sequence;

(ii) means to execute a cache cycle in one clock period on a cache miss sequence (c3c) first queue store means for holding even addresses for invalidation;

(c3d) second queue store means for holding odd addresses for invalidation;

(c3e) control means for simultaneously completing an invalidation cycle of an odd and an even invalidation address, and including means to load, into said first and second queue means, any write command address appearing on said system bus.

2. The system of claim 1 wherein said sequence control means includes:

(a) means to enable processor access to said Tag RAM Module for n clock periods after each completion of an address invalidation cycle.

3. In a computer system having cooperating processor and cache memory means having a Tag memory means and data word memory means, connected by a system bus to main memory and other resource modules, said cache memory means for allocating invalidation cycle address operations and processor request cycles in order to minimize delays in processor access to said cache memory means while still enabling invalidation of obsoleted data words, said cache memory means comprising:

(a) address queue-control means for collected invalidation addresses of words being reconstituted in main memory and requiring invalidation in said cache memory means, including:

(a1) sequencing control means for comparing each of said collected invalidation addresses with addresses in said tag memory means and including:

(d1) means for allocating time cycles for processor access to said cache memory means before and after each invalidation cycle completion which uses two clock periods for invalidating addresses residing in said tag memory means which match (hit) one of said collected addresses;

(a2) an invalidation address queue means for storing addresses to be invalidated in said cache memory means, wherein said invalidation address queue means including:

(a2a) first queue store means for holding even addresses for invalidation;

(a2b) second queue store means for holding odd addresses for invalidation;

(a2c) control means for simultaneously completing an invalidation cycle of an odd and an even invalidation address, and including means to load, into said first and second queue means, any write command address appearing on said system bus;

(a3) queue control means for loading and unloading addresses to be invalidated in said invalidation address queue means (a4) shift out signals from said sequencing control means to enable invalidation addresses to be transmitted to said tag memory (b) processor interface means for receiving addresses of words requested by said processor to be accessed from said cache memory means;

(c) said tag memory means for holding addresses of data words already stored in said cache memory means;

(d) said data word memory means for holding a data word corresponding to each address in said tag memory means.

4. The cache memory means of claim 3 which includes:

(a) multiplexor means for enabling access by said processor interface means or said address queue-control means to said tag memory means;

(b) said sequencing control means for selecting access periods when said address-queue control means or said processor interface means, will be enabled to compare their address input to addresses in said tag memory means and wherein said processor interface means is allocated an access period to said tag memory means before and after completion in one clock period of each invalidation address cycle miss sequence.

5. In a computer system having a central processing module with a central processor and cache memory connected to a system bus for communicating with a main memory holding a plurality of main memory words and an I/O controller, a method for invalidating outdated addresses in said cache memory comprising the steps of:

(a) sensing write commands on said system bus and writing addresses involving Write commands to said main memory, for storage in an invalidation queue means providing one queue for odd addresses and one queue for even addresses;

(b) initiating invalidation cycles, using said addresses stored in said invalidation queue means to a Tag RAM in said cache memory, where each invalidation cycle requires only two clocks for a cache hit condition or only one clock for a cache miss condition;

(c) enabling processor access to said cache memory before and after each said invalidation cycle;

(d) generating an invalid bit signal for each address in said Tag RAM which involved an address hit.

* * * * *